(12) United States Patent
Nishio et al.

(10) Patent No.: US 7,663,361 B2
(45) Date of Patent: Feb. 16, 2010

(54) METAL DETECTION DEVICE

(75) Inventors: Hiroyuki Nishio, Kanagawa (JP);
Toshihiko Nagaoka, Tokyo (JP);
Shigeru Kubotera, Kanagawa (JP)

(73) Assignee: Anritsu Industrial Solutions Co., Ltd., Kanagawa (JP)

( * ) Notice: Subject to any disclaimer, the term of this patent is extended or adjusted under 35 U.S.C. 154(b) by 547 days.

(21) Appl. No.: 11/569,998

(22) PCT Filed: Jun. 3, 2005

(86) PCT No.: PCT/JP2005/010222
§ 371 (c)(1),
(2), (4) Date: Dec. 4, 2006

(87) PCT Pub. No.: WO2005/119302
PCT Pub. Date: Dec. 15, 2005

(65) Prior Publication Data
US 2009/0167299 A1 Jul. 2, 2009

(30) Foreign Application Priority Data
Jun. 4, 2004 (JP) .............................. 2004-167597

(51) Int. Cl.
*G01N 27/72* (2006.01)
*G01R 33/12* (2006.01)
(52) U.S. Cl. ........................... 324/239; 324/326
(58) Field of Classification Search ................ 324/323, 324/326, 329, 228, 234, 239, 243, 207.26; 340/568.1, 686.6, 540, 551
See application file for complete search history.

(56) References Cited

U.S. PATENT DOCUMENTS

| 4,942,360 | A | * | 7/1990 | Candy | 324/329 |
| 5,414,410 | A | * | 5/1995 | Davies et al. | 340/551 |
| 6,724,191 | B1 | * | 4/2004 | Larsen | 324/329 |
| 6,967,574 | B1 | * | 11/2005 | Nelson | 340/551 |

FOREIGN PATENT DOCUMENTS

| JP | 53-23250 | 3/1978 |
| JP | 63-41502 | 8/1988 |
| JP | 4-11187 | 3/1992 |
| JP | 07-221529 | 8/1995 |

OTHER PUBLICATIONS

Super Mepoli II "The Metal Detection Machine", Anritsu, pp. 69-75.

* cited by examiner

*Primary Examiner*—Kenneth J Whittington
(74) *Attorney, Agent, or Firm*—Pearne & Gordon LLP

(57) ABSTRACT

A metal detection device is capable of effectively detecting a metal mixed in food or the like by generating AC magnetic field simultaneously tuned to respective frequencies by a single transmission coil in response to frequency components of different frequencies without switching an element by a switch or the like. Constituent elements constituting magnetic field generation portion are connected so that a transmission coil L1 and a capacitor C1 resonate in the first frequency F1. Moreover, constituent elements are connected so that the transmission coil L1 and a capacitor C2 resonate in the second frequency F2. Furthermore, constituent elements function so as to effectively separate the capacitor C1 and capacitor C2 so that they do not interfere at least in the same frequency.

5 Claims, 7 Drawing Sheets

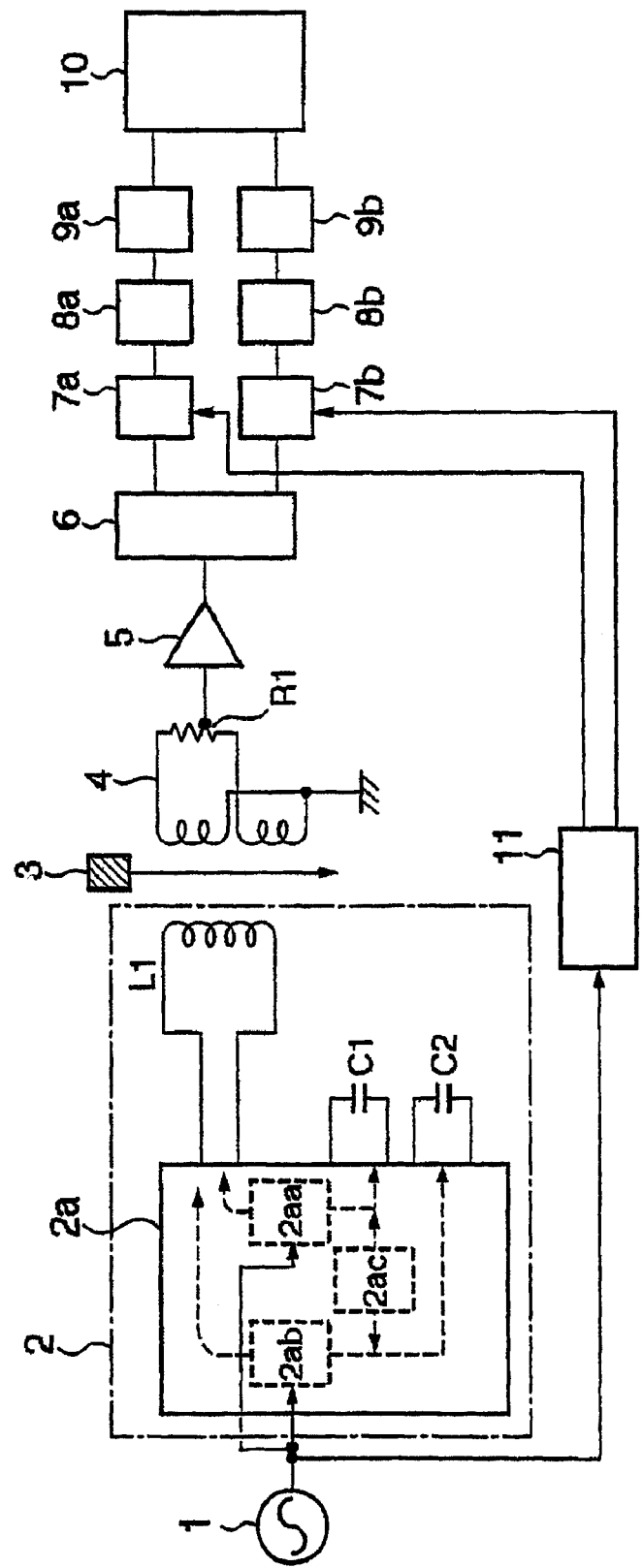
[Fig. 1]

[Fig. 2]
(a)
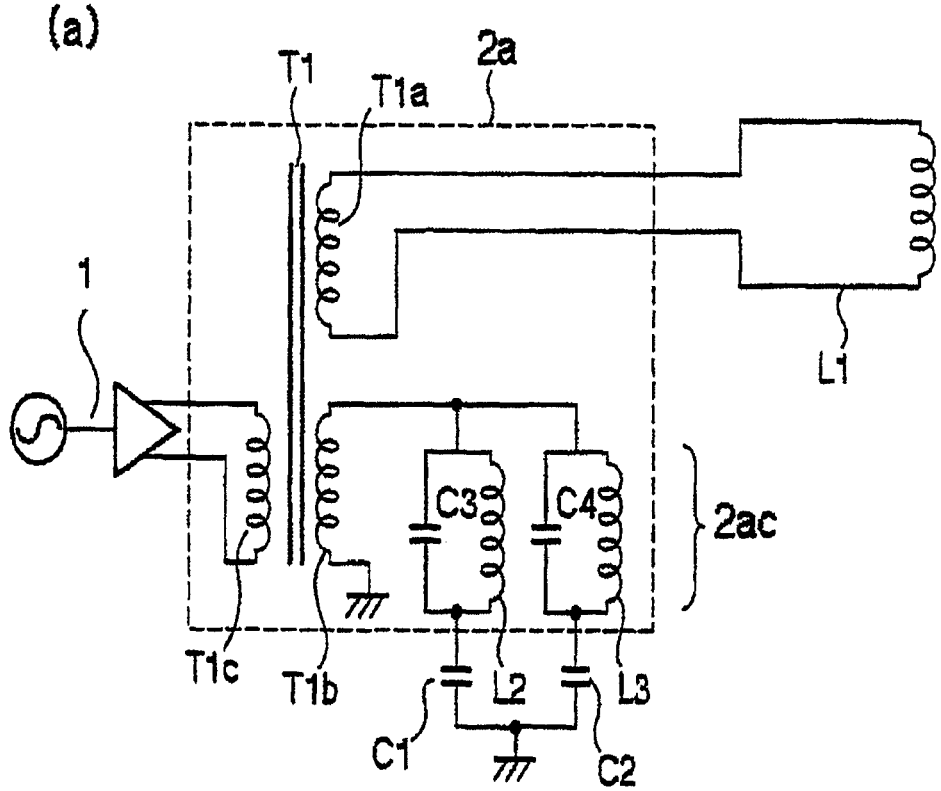
(b)
| Tuning frequency | Tuning element | Connecting Element and state | Isolation element and state |
|---|---|---|---|
| F1 | L1, C1 | L2 with low impedance T1 | L3, C4 are resonated in parallel |
| F2 | L1, C2 | C4 with low impedance T1 | L2, C3 are resonated in parallel |

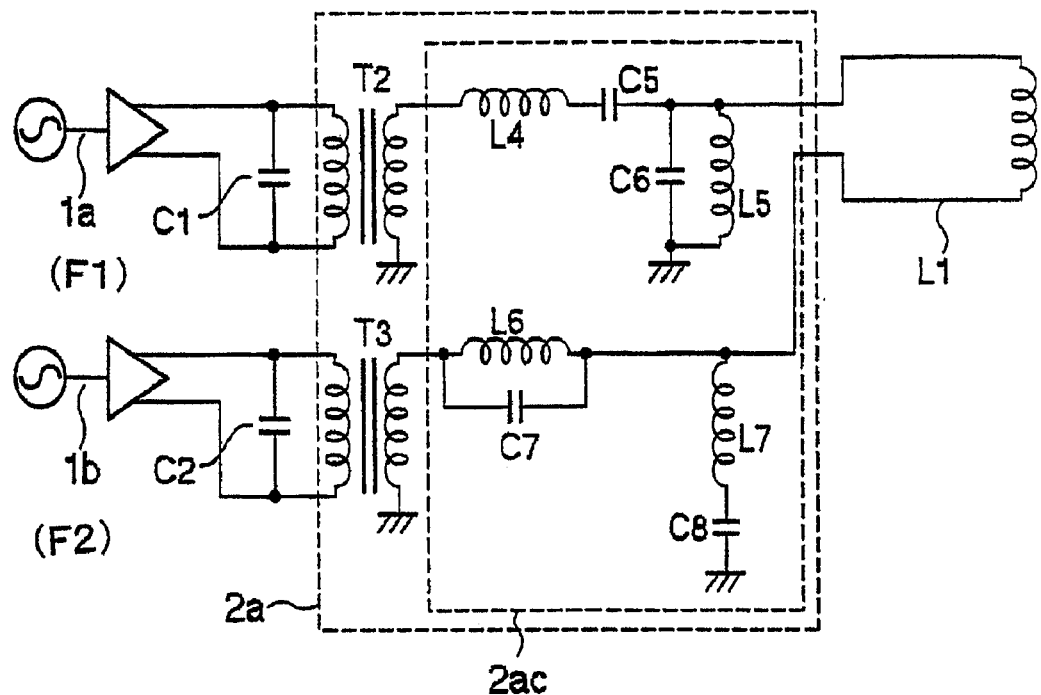

(b)

| Tuning frequency | Tuning element | Connecting element and state | Isolation element and state |
|---|---|---|---|
| F1 | L1, C1 | L4, C5 are resonated in serial<br>L7, C8 are resonated in serial, T2 | L5, C6 are resonated in parallel<br>L6, C7 are resonated in parallel |
| F2 | L1, C2 | C7 with low impedance<br>C6 with low impedance T3 | L4 with high impedance<br>L7 with high impedance |

(c)

| Tuning frequency | Tuning element | Connecting element and state | Isolation element and state |
|---|---|---|---|
| F1 | L1, C1 | L4, C5 are resonated in serial<br>L7, C8 are resonated in serial, T2 | L5, C6 are resonated in parallel<br>L6, C7 are resonated in parallel |
| F2 | L1, C2 | L6 with low impedance<br>L5 with low impedance T3 | C8 with high impedance<br>C5 with high impedance |

[Fig. 4]
(a)
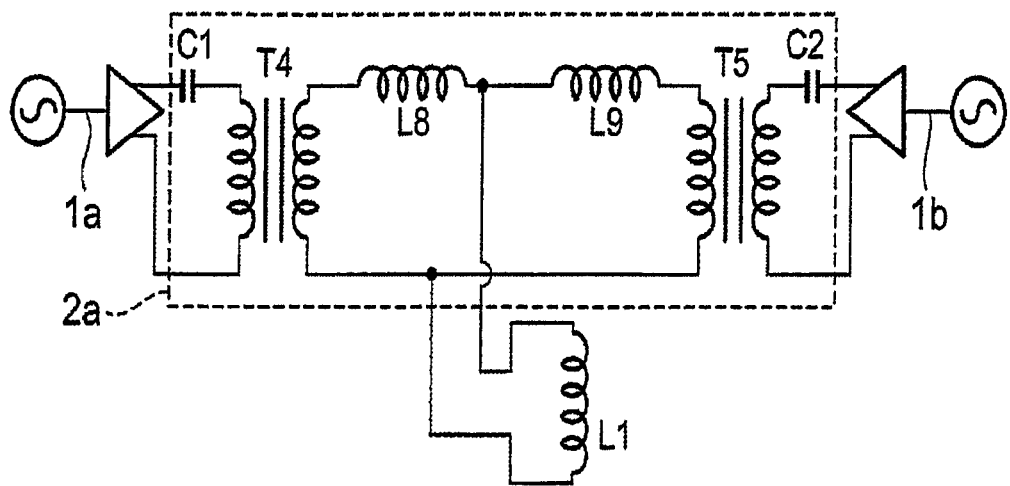
(b)
| Tuning frequency | Tuning element | Connecting element and state | Isolation element and state |
|---|---|---|---|
| F1 | L1 + L8, C1 | T4 | Impedance when viewed from L1 to C2 side |
| F2 | L1 + L9, C2 | T5 | Impedance when viewed from L1 to C1 side |

[Fig. 5]
(a)
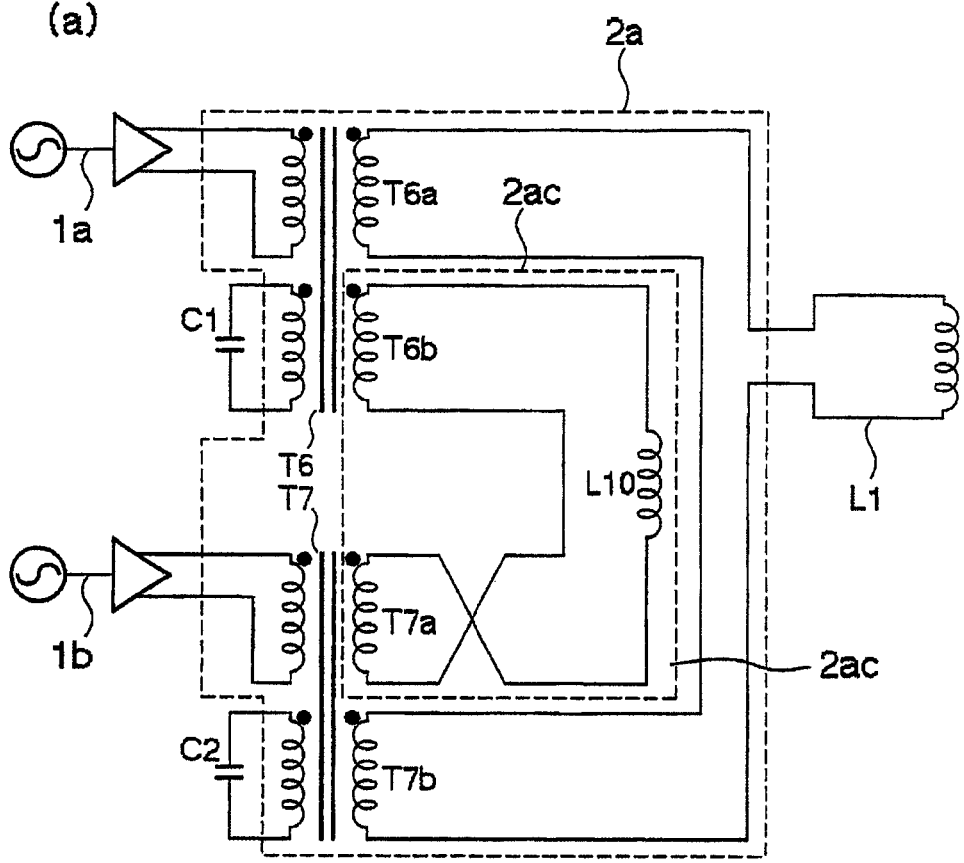
(b)
| Tuning frequency | Tuning element | Connecting element and state | Isolation element and state |
|---|---|---|---|
| F1 | L1, C1 | T6a | F2 element induced by T7a and T7b is cancelled out by T6a and T6b. F1 element induced by T6a and T6b is cancelled out by T7a and T7b. |
| F2 | L1, C2 | T7b | |

[Fig. 6]
(a)
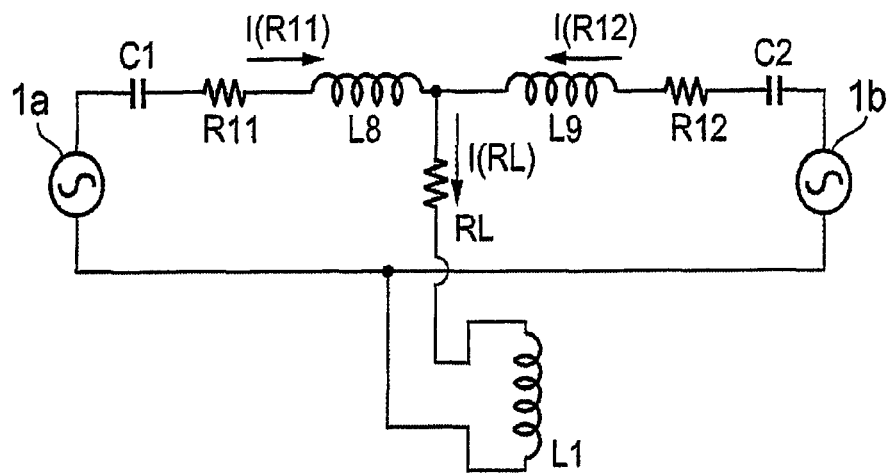
(b)
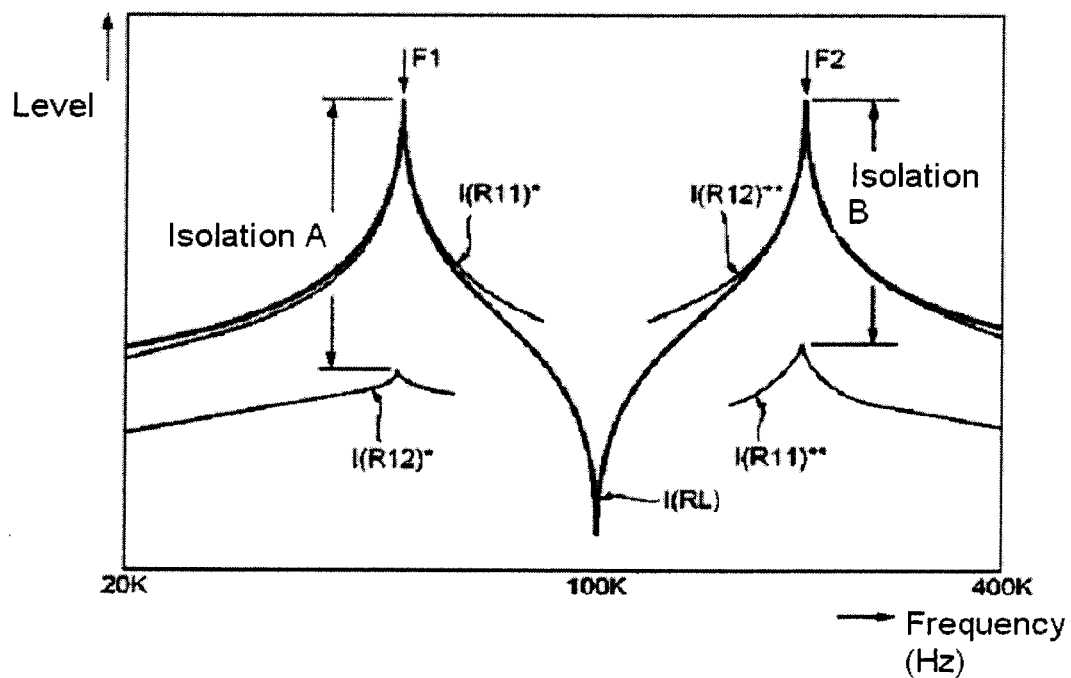

[Fig. 7]
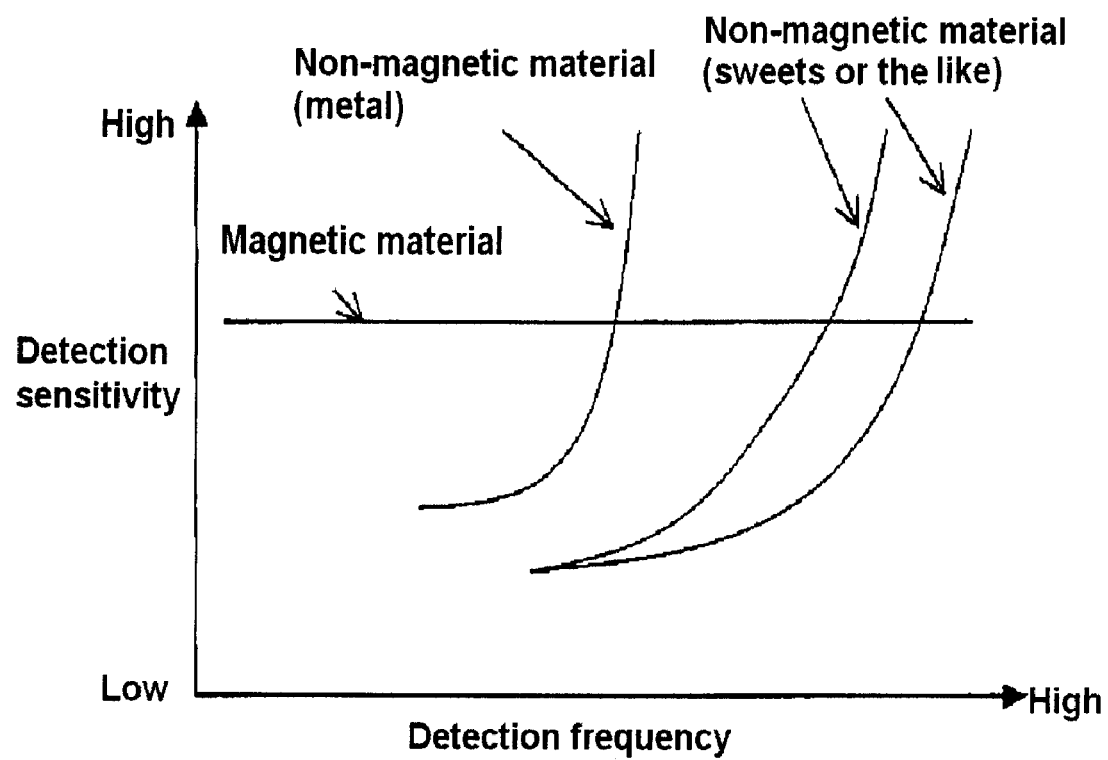

METAL DETECTION DEVICE

TECHNICAL FIELD

The present invention relates to a metal detection device for testing whether a metal is mixed as a foreign object in a test material from a change in the magnetic field after applying an alternating magnetic field on the test material. For a metal detection device that judges whether metal is present in a magnetic material or a non-magnetic material—by applying the magnetic field of a predetermined frequency on test material such as a food, and then detecting any change in the magnetic field from metal mixed in the food—it is necessary to consider responsiveness of the metal to a magnetic field, the food packaging, and the food itself or the like to be detected so as to apply the magnetic field of plural appropriate frequencies to the food. In such metal detection device, the present invention specifically relates to a technology that creates a magnetic field having plural frequency elements simultaneously and effectively so as to enhance metal detection sensitivity.

BACKGROUND ART

Metals to be detected using such an alternating magnetic field are generally classified as either magnetic material or non-magnetic material, and it is known that these two types of materials have different magnetic detection sensitivities (hereinafter referred to as 'frequency sensitivity behavior') to frequencies. Furthermore, food packages as a test material includes paper, resin, and even metal such as aluminum, and these packaging materials each have frequency sensitivity behavior. Moreover, food itself contains salt, water, or the like, for example, so they also have respective frequency sensitivity behaviors. However, for the metal detection device, only metals mixed in the food should be detected at an appropriate sensitivity appropriate for respective frequency sensitivity behavior of the magnetic material or non-magnetic material, and also at a sensitivity that enables distinguishing from the frequency sensitivity behavior of the food and packaging material (See Patent Document 1).

Some prior art metal detection devices create an alternating magnetic field alternately in a time-sharing mode to apply the alternating magnetic field of plural appropriate frequencies. For example, the magnetic field by frequency F1 for detecting the magnetic material and the magnetic field by frequency F2 for detecting non-magnetic material are alternately applied via a transmission coil (so-called antenna coil) to the food in a time-sharing mode every time T, and the signal received by a reception coil via the food is branched into frequency F1 and frequency F2 to process frequency F1 element and frequency F2 element, respectively, in order to individually judge whether magnetic material or non-magnetic material is present (see Patent Document 1, for example).

In this case, the magnetic field is driven for independent processing per frequency, so it is easy to select and set the frequency. However, it takes a longer time to test, as the magnetic field must be generated in turn, and also, it takes a while until the magnetic field becomes stable because a response time is needed when timing the switching of the transmission coil or the like, so there has been a disadvantage that it is inefficient to test food that is being transferred on a conveyor belt.

On the other hand, to eliminate the abovementioned disadvantage of the metal detection device in which the frequency must be switched in turn, there has been a device to create a magnetic field with two different frequencies at the same time to detect metal (for example, see Patent Document 2).

In this case, the problem caused by switching time according to Patent Document 1 is eliminated. However, two frequencies—for example, the frequency signals of tens of kHz and hundreds of kHz—are applied to the same transmission coil, so it is necessary to set up a transmission coil driving circuit with a wide bandwidth, but a tuning circuit is not set up. Therefore, Q (=preserved energy/consumed energy=wL/R=mean frequency/bandwidth, wL is reactance by the transmission coil, and R is the resistance element of a tuning circuit) of a so-called tuning circuit was low, and driving efficiency was poor, so detection sensitivity was low. Low sensitivity may lead to a crucial problem in terms of safety, because the metal detection device tests part of the so-called 'food quality,' so it was hard to put this into practical use.

Non-patent Document 1: 'Super Mepoli II the metal detection machine,' by Shigeru Kubodera and seven other authors, Anritsu Technical, Anritsu Co. Ltd., Issued in July 1999, Issue No. 78, pages 69 to 75

Patent Document 1: Japanese Patent Publication No. S63-41502

Patent Document 2: Japanese Utility Model Publication No. Hei4-11187

DISCLOSURE OF INVENTION

Problems to be Solved by the Invention

The problem with abovementioned Patent Document 2 was that, because one transmission coil is driven by two frequencies with a significant difference for frequency, it is impossible to tune (resonate) it. If a capacitor is switched by a switch or the like for each frequency, it would be possible to tune for every frequency, but this would cause the same problem as in Patent Document 1.

The purpose of the present invention is to provide a metal detection device that can efficiently test metal mixed into food or the like by generating alternating magnetic fields tuned to respective frequencies at the same time in a structure that tunes, without switching by a switch or the like, with one transmission coil in response to plural frequency elements of different frequencies.

Means of Solving the Problems

To achieve the abovementioned purpose, this invention is arranged so that a group of constituent elements that composes a magnetic field generation means connects, in the first frequency F1, a transmission coil L1 and a capacitor C1 so as to resonate them, and also so that another group of constituent elements (this may include part of the group of constituent elements) connects, in the second frequency F2, the transmission coil L1 and a capacitor C2 so as to resonate them. Furthermore, each of such elements is arranged to effectively isolate capacitor C1 and capacitor C2 so that they do not interfere at least at the same frequency.

Now, several terms will be defined. The term 'functional part' is, as mentioned above, because, for example, one constituent element may serve plural functions or actions in reaction to the frequency (this does not mean that it always must react to the frequency, however), the term that is made to be independent in terms of function and reaction. For example, there may be an arrangement in which the element that connected to tune in the first frequency F1 acts so as to be isolated in the second frequency F2, or similarly, the element connected to tune in the second frequency F2 acts so as to be isolated in first frequency F1. Therefore, the term 'functional part' is to make the structure of the invention independent in terms of function and reaction, so this should not be interpreted in a way that respective 'functional part' must be composed of an independent element or an independent circuit.

The 'electrical connection' includes a wired connection by a wire or electrical equipment and a magnetic connection, and this means that it is physically connected at all times. A 'connection' means, for cooperating or to be made to cooperate in order to achieve a particular function. For example, this means that each element, in response to frequency, connects the function that is specific to that the frequency contributes to the function of tuning. Therefore, this should not be interpreted to mean an electrical connection only. 'Effective isolation' means, although both are electrically connected, they are made to not interfere with each other in terms of function and reaction. 'Connecting' can also be called as 'effective connecting.'

A first aspect of the embodiment to achieve the above purpose is a metal detection device for detecting metal contained in a test material based on a change of a magnetic field, which is detected by a reception coil, comprising a magnetic field generation means for generating a magnetic field including a first frequency and a second frequency, which is different from said first frequency, by a transmission coil L1 on said test material that is moving and said reception coil for detecting said change of said magnetic field when said test material is being moved, wherein: said magnetic field generation means has said transmission coil, a first capacitor C1, and a second capacitor C2; and said transmission coil is electrically connected to said first capacitor and said second capacitor, and a jointed portion that comprises a first tuning functional part that connects said transmission coil and the first capacitor in response to said first frequency and tunes to said first frequency, and also comprises a second tuning functional part that connects said transmission coil and said second capacitor in response to said second frequency and tunes to said second frequency.

Further, the first aspect of the embodiment can be modified. In other words, said jointed portion comprises an isolation functional part that effectively isolates said first capacitor and said second tuning functional part and also that effectively isolates said second capacitor and said first tuning functional part.

Further, the first aspect of the embodiment can be modified. In other words, said jointed portion comprises an isolation functional part that isolates, in response to said first frequency and second frequency, said first capacitor and said second capacitor so that they do not interfere with each other at least in the region of the frequency that they tune.

Further, a second aspect of the embodiment to achieve the above purpose is a metal detection device for detecting metal contained in a test material based on a change of the magnetic field, which is detected by a reception coil, comprising a magnetic field generation means for generating a magnetic field including a first frequency and a second frequency, which is different from said first frequency, by a transmission coil on said test material that is moving and said reception coil for detecting said change of said magnetic field when said test material is being moved, includes said magnetic field generation means includes a first capacitor, a second capacitor and a transmission coil; a first signal generation means for outputting the signal of said first frequency to one end of said first capacitor, a second signal generation means for outputting the signal of said second frequency to one end of said second capacitor, a first jointed portion including a first coil for serially connecting the other end of said first capacitor, said first coil, and said transmission coil, and a second jointed portion including a second coil for serially connecting the other end of said second capacitor, said second coil, and said transmission coil, the second jointed portion connected to said first jointed part in order to be parallel with said transmission coil; and said first capacitor, said first coil, and said transmission coil compose a first tuning functional part for tuning to said first frequency, and said second capacitor, said second coil, and said transmission coil compose a second tuning functional part for tuning to said second frequency.

Further, a third aspect of the embodiment to achieve the above purpose is a metal detection device for detecting metal contained in a test material based on a change in the magnetic field, which is detected by a reception coil, comprising a magnetic field generation means for generating a magnetic field including a first frequency and a second frequency, which is different from said first frequency, by a transmission coil on said test material that is moving and said reception coil for detecting said change of said magnetic field when said test material is being moved, includes said magnetic field generation means has said transmission coil, a first capacitor, and a second capacitor; and said transmission coil is electrically connected to the first capacitor and second capacitor, and a jointed portion comprising a first tuning functional part that connects said transmission coil and said first capacitor to tune in the region of said first frequency, a second tuning functional part that connects said transmission coil and said second capacitor to tune in the region of said second frequency, and an isolation functional part that cancels the component of said second frequency on said first tuning functional part received in the region of said first frequency from said second tuning functional part by the reverse component and also cancels the component of said first frequency on said second tuning functional part received in the region of said second frequency from said first tuning functional part by the reverse component.

A magnetic field in the invention can be arranged in response to plural frequencies to share a transmission coil for tuning plural frequencies, and can be arranged to prevent interaction between two tuning functional parts and to enable tuning respectively, so an alternating magnetic field tuned to respective frequencies can efficiently be generated. Furthermore, this can improve the detection sensitivity for metal content, and then there is an effect in which the metal mixed into food can efficiently be tested.

BRIEF DESCRIPTION OF THE DRAWING

FIG. 1 A functional block diagram of an embodiment according to the present invention.

FIGS. 2 (*a*) and (*b*) are views illustrating the structure of the first example and a table of functions/actions of constituent elements regarding the magnetic field generation means 2 including the jointed portion 2*a* of FIG. 1.

FIGS. 3 (*a*), (*b*), and (*c*) are views illustrating the structure of the second example and tables of functions/actions of constituent elements regarding the magnetic field generation means 2 including the jointed portion 2*a* of FIG. 1.

FIGS. 4 (*a*) and (*b*) are views illustrating the structure of the third example and a table of functions/actions of constituent elements regarding the magnetic field generation means 2 including the jointed portion 2*a* of FIG. 1.

FIGS. 5 (*a*) and (*b*) are views illustrating the structure of a fourth example and a table of functions/actions (F1<F2) of constituent elements regarding the magnetic field generation means 2 including the jointed portion 2*a* of FIG. 1.

FIG. 6 (a) shows an equivalent circuit in FIG. 4 (a), and R11 is a residual resistance for L8, R12 is a residual resistance for L9, and RL is a residual resistance for L1. FIG. 6 (b) is a view illustrating circuit simulation data in FIG. 6 (a), and I (R11)*·I (R12)* is the current flowing in R11 by signal generation means 1a, and I (R11)·I (R12) is the currents flowing in R12 by signal generation means 1b.

FIG. 7 A view illustrating the trend of frequency sensitivity behavior for each material.

EXPLANATION OF REFERENCES 1 signal generation means
2 magnetic field generation means
2a jointed portion
2aa F1 tuning functional part (first tuning functional part)
2ab F2 tuning functional part (second tuning functional part)
2ac isolation functional part
3 test material
4 reception coil
5 amplifier
6 branching filter
7a, 8b detecting means
8a, 7b filter
9a, 9b judging means
10 processing means
11 phase-shifting means

BEST MODE FOR THE INVENTION

Embodiments of the present invention will be explained with reference to FIG. 1 to FIG. 7. FIG. 1 is a functional block diagram illustrating the technical view of the metal detection device according to the present invention, and FIGS. 2 (a) and (b) to FIGS. 6 (a) and (b) are views illustrating the structure and tables of functions/actions of each view of the first to fourth examples regarding the magnetic field generation means 2 including the jointed portion 2a in FIG. 1. FIG. 7 is a view illustrating the trend of magnetic frequency sensitivity behavior for each material.

In FIG. 1, a signal generation means 1 outputs a signal including at least plural different frequency F1 elements and F2 elements (F1<F2). The signal generation means 1 has a signal source generating frequency F1 and a signal source generating frequency F2, and it can be arranged to overlap such signal sources and then output, or to have both frequency F1 element and frequency F2 element originally. An example explained later will include one using both of these as appropriate for the purpose thereof.

The specific value for frequency F1 or F2 is set to a frequency that enables distinguishing of metal from food and packaging material to detect the metal only by considering frequency sensitivity behavior of each material shown in FIG. 7, or in other words, food as the test material 3, metal mixed into the food (magnetic material and non-magnetic material to be detected), and the frequency sensitivity behavior of such food package material. In general, a frequency of tens of kHz to hundreds of kHz is set. Then, a lower frequency (frequency F1) is used for magnetic material detection, and a higher frequency (frequency F2) is used for non-magnetic material detection. It is noted that the structure and operation are explained by the two frequencies of F1 and F2, but it is still within the scope of the present invention, even if this has three frequencies depending on the material that is considered to be mixed.

A magnetic field generation means 2 is arranged to include a jointed portion 2a, a transmission coil L1, a capacitor C1, and a capacitor C2. The transmission coil L1, capacitor C1, and capacitor C2 are elements constituting a tuning circuit, and are electrically connected to the jointed portion 2a. The jointed portion 2a connects the transmission coil L1 and capacitor C1 so that they are tuned (resonated) to frequency F1 (The connected functional structure is called 'F1 tuning functional part 2aa.'), and connects the transmission coil L1 and capacitor C2 so that they are tuned (resonated) to frequency F2 (The connected functional structure is called a 'F2 tuning functional part 2ab.').

Such F1 tuning functional part 2aa and the F2 tuning functional part 2ab share the transmission coil L1 as a part of the tuning element, but their tuning frequencies are different. Accordingly, the jointed portion 2a effectively isolates, in the region including frequencies F1 and F2, the function and the action of capacitor C1 and capacitor C2 in terms of frequency, so that the function of capacitor C1 that is a part of the tuning element of frequency F1 does not contribute to frequency F2 tuning function, or, the function of capacitor C2 that is part of the tuning element of frequency F2 does not contribute to frequency F1 tuning function. (The functional structure to be isolated is called an 'isolation functional part 2ac.')

In this way, although the jointed portion 2a includes, as the function/action, the F1 tuning functional part 2aa, the F2 tuning functional part 2ab, and the isolation functional part 2ac, their constituent elements are mainly a transformer, a coil, and/or a capacitor. A direct or indirect electrical connection is provided between such elements, and between such elements and the transmission coil L1, the capacitors C1 and C2 (a magnetic connection is included in this electrical connection). Values and properties of these elements are decided depending on what type of circuits compose the abovementioned tuning functional parts 2aa, 2ab, and the isolation functional part 2ac, and how elements used for these share functions in the region of frequencies F1 and F2 of the abovementioned tuning functions and isolation functions. Specific examples of these will be explained in Examples 1, 2, 3, and 4.

The process from the operation of the reception coil 4 until judging whether metal is mixed or not is generally the same as in Patent Document 2, so this will be explained only briefly here.

The reception coil 4 detects a change in the alternating magnetic field of frequencies F1 and F2 that the magnetic field generation means 2 generates for the test material 1 (including the metal mixed) transferred on the conveyor belt (not shown). The reception coil 4 detects a change in the magnetic field as a change in the amplitude (phase) of frequency F1 element or frequency F2 element. The reception coil 4 has two coils that are connected so as to invert their phases to each other, and the signal showing a change in the magnetic field is collected from the tap of the resistance R that balances output from these two coils and is then amplified by the amplifier 5.

The branching filter 6 branches signals into the element of frequency F1 and the element of frequency 2. This is to process subsequent processes separately for the element of frequency F1 and the element of frequency 2. That is, this is to perform the metal detecting processes for the magnetic material and non-magnetic material separately.

A detecting means 7a, a filter 8a, and a judging means 9a detect frequency F1 element. The detection means 7a receives a synchronous signal that is synchronized to frequency F1 element from the phase-shifting means 11 to extract frequency F1 element. Furthermore, this is integrated by the filter 8a to compare, by the judging means 9a, the integrated value and standard level of the magnetic material that was already memorized. If the integrated value exceeds the standard level, it is judged that the metal of the magnetic material that is a foreign object is mixed, and if it does not, it is judged that such metal is not mixed.

A detecting means 7b, a filter 8b, and a judging means 9b detect frequency F2 element. The detection means 7b receives a synchronous signal that is synchronized to frequency F2 element from the phase-shifting means 11 to extract frequency F2 element. Furthermore, this is integrated by the filter 8b to compare, by the judging means 9b, the integrated value and standard level of the non-magnetic material that was already memorized. If the integrated value exceeds the standard level, it is judged that the metal of non-magnetic material that is a foreign object is mixed in, and if it does not, it is judged that such metal is not mixed in.

The processing means 10 outputs the judgment results of the judging means 9a and 9b to the display means or the like.

EXAMPLE 1

FIG. 2 (a) is a view illustrating an electrical structure as an example of the magnetic field generation means 2 of the present embodiment. FIG. 2 (b) shows the main functions/actions of the constituent elements. The connecting element that contributes to the tuning elements and tuning functions in FIG. 2 (b) will be a main element of the tuning functional part, and the isolation element will be a main element of the isolation functional part (The same is true of FIG. 3 (b), FIG. 3 (c), FIG. 4 (b), and FIG. 5 (b)).

In FIG. 2 (a), the signal generation means 1 enters a signal (F1<F2) including frequency F1 element and F2 element, via windings T1c and T1b of transformer T1, to the magnetic field generation means 2. The dotted line in FIG. 2 (a) shows the jointed portion 2a. In FIG. 2 (a), coil L2 and capacitor C3 resonate with frequency F2 in parallel, and coil L3 and capacitor C4 are set to a value that is resonated with frequency F1 in parallel.

Therefore, in the region of frequency F1, the transmission coil L1 is, via the windings T1a and T1b of transformer T1 and coil L2 (this will be low impedance for frequency F1.), connected to capacitor C1 to be tuned (resonated). In the region of frequency F2, the transmission coil L1 is, via windings T1a and T1b of transformer T1 and capacitor C4 (this will be low impedance for frequency F2.), connected to capacitor C2 to be tuned (resonated).

In short, the transmission coil L1, windings T1a and T1b of transformer T1, coil L2 and capacitor C1 compose the F1 tuning functional part 2aa, while the transmission coil L1, windings T1a and T1b of transformer T1, capacitor C4 and capacitor C2 compose the F2 tuning functional part 2ab. Furthermore, coil L2 and capacitor C3 composes the isolation functional part 2ac by resonating in parallel by frequency F2 to effectively isolate, for frequency F2 region, capacitor C1 from capacitor C2 or the F2 tuning functional part 2aa, and similarly, coil L3 and capacitor C4 composes the isolation functional part 2ac by resonating in parallel with effectively isolate, in the region of frequency F1, capacitor C2 from capacitor C1 or the F1 tuning functional part 2ab. On the other hand, coil L2 and capacitor C4 have, respectively, low impedance by frequency F1 and frequency F2, and as pass elements, contribute to the connecting of the F1 tuning functional part 2aa and the F2 tuning functional part 2ab.

EXAMPLE 2

FIG. 3 (a) is a view illustrating an electrical structure as other example of the magnetic field generation means 2. FIG. 3 (b) shows the main functions/actions of constituent elements when the signal of frequency F1 element outputted by the signal generation means 1a in FIG. 3 (a) has lower frequency than the signal of frequency F2 element outputted by the signal generation means 1b (F1<F2), and FIG. 3 (c) shows the main functions/actions of constituent elements when the signal of frequency F1 element outputted by the signal generation means 1a in FIG. 3 (a) has higher frequency than the signal of frequency F2 element outputted by the signal generation means 1b (F1>F2). In FIG. 3 (a), the signal generation means 1a and 1b input signal of frequency F1 element and the signal of frequency F2 element, respectively, via transformer T2 or T3 to the magnetic field generation means 2.

With reference to FIGS. 3 (a) and (b), an example when the signal of frequency F1 element in FIG. 3 (a) has a lower frequency than the signal of frequency F2 element (F1<F2) will be explained. Main functions/actions of constituent elements will be explained. In FIG. 3 (a), in the region of frequency F1, via a serial resonance circuit of coil L4 and capacitor C5 (resonated to frequency F1), serial resonance of coil L7 and capacitor C8 (resonated to frequency F1), and transformer T2, the transmission coil L1 is connected to capacitor C1 to tune (resonate) to frequency F1 to compose the F1 tuning functional part 2aa. In the region of frequency F2, the transmission coil L1, via the capacitors C6 and C7 (both having low impedance for frequency F2) and transformer T3, is connected to capacitor C2 to tune (resonate) to frequency F1 to compose the F2 tuning functional part 2ab.

In FIGS. 3 (a) and (b), for frequency F1, coil L6 and capacitor C7 are resonated in parallel with block entrance of frequency F1 into capacitor C2, and coil L5 and capacitor C6 resonate in parallel with frequency F1 to prevent frequency F2 from flowing into capacitor C1 side. Furthermore, for frequency F2, the coils L4 and L7 have high impedance to block entering of frequency F2 into capacitor C1 to compose the isolation functional part 2ac.

If frequency F1 in FIG. 3 (a) is higher than frequency F2 (F1>F2), as shown in FIG. 3 (c), the tuning element is the same as in Figure (b), but the connecting element contributing to the tuning functional part and their isolation elements composing the isolation functional part are different. A detailed description of this is not explained here. It is noted that transformers T2 and T3 are not always required, and their primary and secondary may be directly connected. It is preferable to compose the circuit in consideration of the frequency, element, and so forth to be used.

EXAMPLE 3

FIG. 4 (a) is a view illustrating the electrical structure of another example of the magnetic field generation means 2. FIG. 4 (b) shows the main functions/actions of constituent elements. In FIG. 4, the signal generation means 1a and 1b respectively enter the signal of frequency F1 element and the signal of frequency F2 element (F1<F2 in this example) via capacitor C1 and transformer T2, or capacitor C2 and transformer T3, to the magnetic field generation means 2. It is noted that impedance viewed from capacitor C1 to the signal generation means 1a and impedance viewed from capacitor C2 to the signal generation means 1b are assumed to be low at least in respective frequency.

In FIG. 4, in the region of frequency F1, the transmission coil L1 is, via coil L8 and transformer T4, connected to capacitor C1 to tune (in this case, resonate by L1+L8 and C1) to compose the F1 tuning functional part 2aa and to compose the isolation functional part 2ac that isolates capacitor C2 by high impedance viewed from coil L1 to capacitor C2. In the region of frequency F2, the transmission coil L1 is, via coil L9 and transformer T5, connected to capacitor C2 to tune (in this case, resonate by L1+L9 and C2) to compose the F2 tuning functional part 2ab, and to compose the isolation functional part 2ac that isolates capacitor C1 by high impedance viewed from coil L1 to capacitor C1 side. In short, the isolation functional part 2ac in FIG. 4 (a) comprises the parallel connection of the F1 tuning functional part 2aa and the F2 tuning functional part 2ab when viewed from the transmission coil L1. It is noted that the transformers T4 and T5 are not always required, but their primary and secondary can be directly connected. It is preferable for the circuit to be arranged in consideration of the frequency, element, and so forth to be used.

FIG. 6 (a) shows an equivalent circuit of FIG. 4 (a), and FIG. 6 (b) shows its simulation result. Resistances R11, R12, and RL in FIG. 6 are, respectively, an equivalent resistance for coil L8, coil 9, and the transmission coil L1. FIG. 6 (b) shows the frequency along its horizontal axis, and the level along its vertical axis, both in logarithmic scale. The design allows coil L8 and the transmission coil L1 to be tuned to any of frequency F1=30-80 kHz, and coil L9 and the transmission coil L1 to be tuned to the value of about the fourth time of frequency F2=frequency F1. Resistances R11 and R12 are assumed to be 0.5 ohm and R1 to be 0.1 ohm for calculation. Currents I (R11), I (R12), and I (RL) respectively flow in resistances R1, R2, and RL. Therefore, I (RL) is the current that generates the desired magnetic field.

With reference to FIG. 6 (b), the following description is true. That is, from the steepness of the tuning curve around frequency F1 and the steepness around frequency F2, Q (about 50 to 60) is nearly same. Secondly, the differences between current I (R11) and current I (R12) for these two tuning frequencies are isolations A and B, but they are maintained at nearly a sufficient level. In short, Q in tuning frequencies demonstrates the advantage as a tuning functional part, and the isolation demonstrates the advantage as the isolation functional part.

It is noted that the abovementioned frequency F1 is suitable for detection of magnetic material metal, while frequency F2 is suitable for detection of magnetic material metal.

EXAMPLE 4

FIG. 5 (a) is a view illustrating the electric structure of another example of the magnetic field generation means 2 of this embodiment. FIG. 5 (b) shows the main functions/actions of the constituent elements. In FIG. 5, the signal generation means 1a creates a signal including frequency F1, and supplies it to the transmission coil L1 and capacitor C1 that are separately connected to other windings of transformer T6. The transmission coil L1 and capacitor C1 are connected by transformer T6, and are tuned to frequency F1 (F1 tuning functional part 2aa). The signal generation means 1b creates the signal of frequency F2 and supplies it to the transmission coil L1 and capacitor C2 that are connected to the other windings of transformer T7 respectively. The transmission coil L1 and capacitor C2 are connected by transformer T7, and are tuned to frequency F2 (F2 tuning functional part 2ab).

On the other hand, the transmission coil L1 is connected to winding T6a of transformer T6 and winding T7b of transformer T7 in serial. Furthermore, winding T6b of transformer T6 and winding T7a of coil L10 and transformer T7 are serially connected, with the output terminal of winding T7a (or this may be an output terminal of winding T6a) intersected. The inductor value of coil L10 is almost the same as the value of the transmission coil L1. It is noted that, • shown with the winding of transformers T6 and T7 in FIG. 5 (a) indicates polarity.

In such structure as FIG. 5 (a), when focusing on frequency F1, the element of frequency F1 will be generated in any of windings T6a, T6b, T7b, and T7a, but in particular, the element of frequency F1 generated in winding T7b is cancelled out by the reversed element generated in winding T7b by the element of frequency F1 generated in winding T7a (the element is cancelled). The same is true of the element of frequency F2. That is, the element of frequency F2 will be generated in any of windings T7a, T7b, T6a, and T6b, but in particular, the element of frequency F2 generated in winding T6a is cancelled out by the reversed element generated in winding T6a by the element of frequency F2 generated in winding T6b. Coil L10 uses a similar value as the transmission coil and compensates for loss, so cancellation of the abovementioned element is more perfectly ensured.

Thus, winding T6b of transformer T6, coil L10, and winding T7a of transformer T7 can, in the region of frequency F1, ignore the side of transformer T7 when viewed from the transmission coil L1 (contributing to the tuning function as well), so it isolates capacitor C2 from tuning of the transmission coil L1 and capacitor C1. Furthermore, in the region of frequency F2, the side of transformer T6 can be ignored when viewed from the transmission coil L1 (contributing to the F2 tuning function as well), so it isolates capacitor C1 from tuning of the transmission coil L1 and capacitor C2 (composing the isolation functional part 2ac).

In FIG. 5 (a), although the output terminal of transformer T7a is intersected, an output terminal of one winding of T6b, T6a, and T7a may instead be intersected. Furthermore, instead of intersecting the output terminal of the winding, the direction of winding may be reversed. In any case, the design only requires preventing capacitor C1 from contributing to the F2 tuning function 2aa, and also preventing capacitor C2 from contributing to the F1 tuning function. Furthermore, FIG. 5 (a) shows the circuit in a way that is easy to comprehend. However, although a number of variations such as sharing the winding can be considered, the technology in which a loop composed of winding T6b (F1 tuning functional part 2aa side) and winding T7a (F2 tuning functional part 2ab side) is composed of the same loop composed of the transmission coil L1, winding T6a (F1 tuning functional part 2aa side), and winding T7b (F2 tuning functional part 2ab side) to cancel out the influence on the F2 tuning functional part 2ab side by the F1 tuning functional part 2aa side and to cancel out the influence on the F1 tuning functional part 2ab side by the F2 tuning functional part 2aa side is still within the scope of the present invention.

In the abovementioned examples, although Examples 1 and 2 are arranged by using elements with a particularly significant frequency dependence, Examples 3 and 4 have less frequency dependence. In particular, Example 4 includes capacitors C1 and C2 that are resonance elements, apart from the transmission coil L1 and coil L10 that are shared for frequencies F1 and F2, so the jointed portion 2a of Example 4 can, without responding to the frequency, compose tuning functional parts 2aa and 2ab and the isolation functional part 2ac (Therefore, naturally, every function is effective for frequency F1 and frequency F2 regions). Thus, Example 4 is composed by a design related to the frequency as well as elements that require less adjustment and are easy to create.

What is claimed is:

1. A metal detection device for detecting metal contained in a test material based on a change of a magnetic field, which is detected by a reception coil, comprising a magnetic field generation means (2) for generating a magnetic field including a first frequency and a second frequency, which is different from said first frequency, by a transmission coil (L1) on said test material that is moving and said reception coil (4) for detecting said change of said magnetic field when said test material is being moved, wherein:

said magnetic field generation means has said transmission coil, a first capacitor (C1), and a second capacitor (C2);

said transmission coil is electrically connected to said first capacitor and said second capacitor; and said magnetic field generation means further has a jointed portion (2*a*) that comprises a first tuning functional part (2*aa*) that connects said transmission coil and said first capacitor in response to said first frequency and tunes to said first frequency, and also comprises a second tuning functional part (2*ab*) that connects said transmission coil and said second capacitor in response to said second frequency and tunes to said second frequency.

2. The metal detection device according to claim 1, wherein said jointed portion comprises an isolation functional part (2*ac*) that effectively isolates said first capacitor and said second tuning functional part and that also effectively isolates said second capacitor and said first tuning functional part.

3. The metal detection device according to claim 1, wherein said jointed portion comprises an isolation functional part (2*ac*) that isolates, in response to said first frequency and second frequency, from said first capacitor and said second capacitor so that they do not interfere with each other at least in the region of the frequency that they tune.

4. A metal detection device for detecting metal contained in a test material based on a change of a magnetic field, which is detected by a reception coil, comprising a magnetic field generation means (2) for generating a magnetic field including a first frequency (F1) and a second frequency (F2), which is different from said first frequency, by a transmission coil (L1) on said test material that is moving and said reception coil (4) for detecting said change of said magnetic field when said test material is being moved, wherein:

said magnetic field generation means includes a first capacitor (C1), a second capacitor (C2), and a transmission coil (L1);

a first signal generation means (1*a*) for outputting the signal of said first frequency to one end of said first capacitor, a second signal generation means (1*b*) for outputting the signal of said second frequency to one end of said second capacitor, a first jointed portion including a first coil (L8) for serially connecting the other end of said first capacitor, said first coil, and said transmission coil, and a second jointed portion including a second coil (L9) for serially connecting the other end of said second capacitor, said second coil, and said transmission coil, the second jointed portion connected to said first jointed part in order to be parallel with said transmission coil; and said first capacitor, said first coil, and said transmission coil compose a first tuning functional part (2*aa*) for tuning to said first frequency, and said second capacitor, said second coil, and said transmission coil compose a second tuning functional part (2*ab*) for tuning to said second frequency.

5. A metal detection device for detecting metal contained in a test material based on a change of a magnetic field, which is detected by a reception coil, comprising a magnetic field generation means (2) for generating a magnetic field including a first frequency and a second frequency, which is different from said first frequency, by a transmission coil (L1) on said test material that is moving and said reception coil (4) for detecting said change of said magnetic field when said test material is being moved, wherein:

said magnetic field generation means has said transmission coil, a first capacitor (C1), and a second capacitor (C2); and said transmission coil is electrically connected to said first capacitor and said second capacitor, as well as a jointed portion (2*a*) comprising a first tuning functional part (2*aa*) that connects said transmission coil and said first capacitor to tune in the region of said first frequency, a second tuning functional part (2*ab*) that connects said transmission coil and said second capacitor to tune in the region of said second frequency, and an isolation functional part (2*ac*) that cancels the component of said second frequency on said first tuning functional part received in the region of said first frequency from said second tuning functional part by the reverse component and also cancels the component of said first frequency on said second tuning functional part received in the region of said second frequency from said first tuning functional part by the reverse component.

* * * * *

UNITED STATES PATENT AND TRADEMARK OFFICE
CERTIFICATE OF CORRECTION

PATENT NO. : 7,663,361 B2 Page 1 of 1
APPLICATION NO. : 11/569998
DATED : February 16, 2010
INVENTOR(S) : Nishio et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this

Thirtieth Day of November, 2010

David J. Kappos
*Director of the United States Patent and Trademark Office*